C. R. PIGGINS.
AUTOMOBILE SIGNAL.
APPLICATION FILED JUNE 2, 1916.
1,286,403.
Patented Dec. 3, 1918.
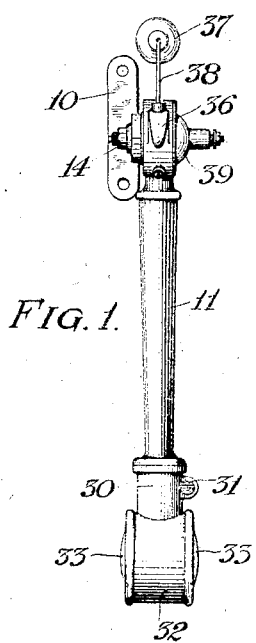
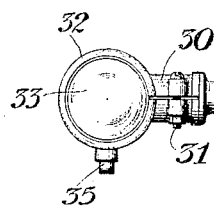
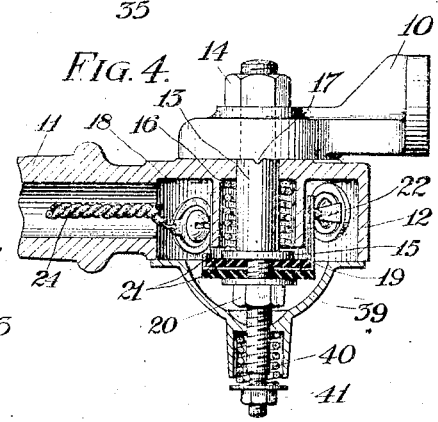
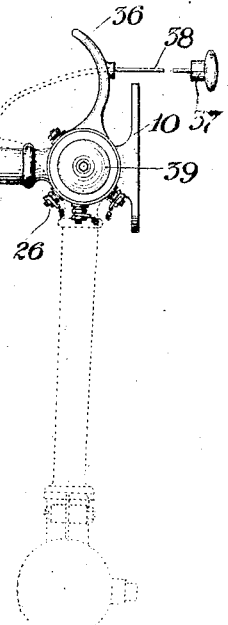
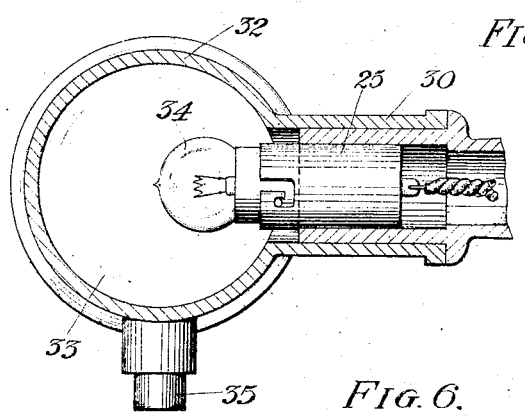
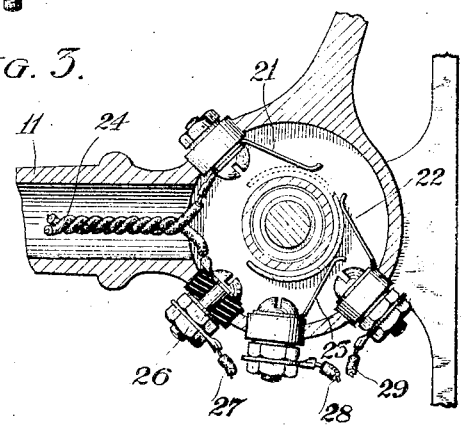
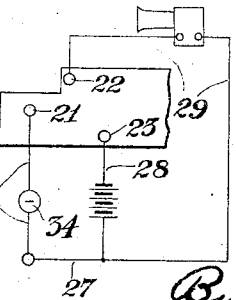
WITNESS
C. L. Waal
INVENTOR.
Charles R. Piggins
By R. S. C. Caldwell
ATTORNEY

UNITED STATES PATENT OFFICE.

CHARLES R. PIGGINS, OF RACINE, WISCONSIN.

AUTOMOBILE-SIGNAL.

1,286,403.

Specification of Letters Patent.

Patented Dec. 3, 1918.

Application filed June 2, 1916. Serial No. 101,209.

*To all whom it may concern:*

Be it known that I, CHARLES R. PIGGINS, a citizen of the United States, and resident of Racine, in the county of Racine and State of Wisconsin, have invented new and useful Improvements in Automobile-Signals, of which the following is a description, reference being had to the accompanying drawings, which are a part of this specification.

This invention relates to automobile signals, and has for its object to provide a signal arm which may be swung out from the side of the automobile to indicate the intention of the driver to make a turn, such signal means when operated at night serving to automatically light an electric lamp carried thereby to attract attention to the signal.

Another object of the invention is to provide such a signal with means whereby it may be operated at times when the curtains are up.

Another object of the invention is to provide such a signal with an automatic switch which in one position of the signal alarm will light the signal lamp, as mentioned, and in another position will sound the warning horn.

With the above and other objects in view the invention consists in the automobile signal as herein claimed and all equivalents.

Referring to the accompanying drawings, in which like characters of reference indicate the same parts in the different views, Figure 1 is a side view of an automobile signal constructed in accordance with this invention;

Fig. 2 is a rear view thereof with the signal arm in its extended position in full lines and in its released position in dotted lines;

Fig. 3 is a longitudinal sectional view thereof;

Fig. 4 is a sectional view of the switch mechanism;

Fig. 5 is a detail view of the switch contact shell;

Fig. 6 is a diagram of the electrical circuits.

In these drawings 10 indicates a bracket adapted to be secured to the side of an automobile, and 11 is a tubular arm which has a cylindrical casing 12 at one end through which it is pivotally mounted on the bracket 10, there being a shouldered stud 13 passing through an opening in the bracket and firmly clamping the bracket between its shoulder and a nut 14 threaded on its end and serving as the pivotal support for the arm 11. The stud 13 has a flange 15 forming a spring seat for a coil spring 16 which surrounds the stud, said spring bearing at one end against the flange and at the other end against the casing 12 to hold said casing in frictional engagement with the face of the bracket 10 in order that it may remain wherever placed. If desired, suitable lugs 17 may be provided on one engaging face to fit notches in the other engaging face and thus more securely clamp the arm in its adjustments. The coil spring 16 is preferably surrounded by a housing formed by a cylindrical flange 18 projecting from the casing 12.

A flanged cylindrical contact shell 19 is mounted on the stud 13, being clamped by a nut 20 against the flange 15 and between a pair of insulating disks 21 which at their outer edges engage the inturned flange of the contact shell between them. This contact shell, as shown in Fig. 5, has a cut-away portion with stepped contact areas engaged by spring brushes 21, 22, and 23 respectively which are mounted in the wall of the casing 12, though insulated therefrom. The contact brush 21 is connected to one of a pair of lamp cords 24 passing through the tubular arm 11 and connected with a lamp socket 25 at the outer end thereof, while the other lamp cord is connected to a binding post 26 in the casing 12. One battery terminal 27 is connected with the binding post 26, while the other battery terminal 28 is connected with the brush 23 which is constantly in engagement with the contact shell 19. The contact brush 22 is connected with a wire 29 leading to the electric horn so that when it engages the contact shell 19 the horn will be sounded, this being in the extreme upper position of the arm 11. Before the arm reaches the full upper position the contact brush 21 engages the contact shell 19 to cause the lamp to burn. At the outer end of the arm 11 there is a split sleeve 30 clamped thereto by means of a clamping bolt 31 and carrying a cylindrical lamp casing 32 with red lenses 33 in the opposite sides thereof which will show a signal light whenever the electric lamp 34 contained in the lamp socket 25 is lighted. A rubber bumper 35 projecting from the lower part of the casing is adapted to strike the side of the car when the signal is lowered to prevent injury thereto. The signal arm is raised by means of a handle 36 projecting from the casing 12 or by means of a knob 37 connected by a cable 38 with said handle, which knob is provided for convenience in operating the signal at times when the handle cannot be reached, as when the side curtains are up.

The casing 12 is preferably provided with a cover 39 which is slidably mounted on the stud 13 and is held with spring pressure against the edge of the casing, there being a coil spring 40 seated in a recess at the end of the cover and held in place by a nut 41 threaded on the end of the stud.

In operation it is only necessary for the driver of the automobile to pull upon the handle 36 or the knob 37 when he intends to turn, thus causing the arm 11 to be extended to its horizontal position. In moving to this position the arm first brings the lamp brush 21 and then the horn brush 22 into contact with the shell 19 and consequently the arm may be partly raised so as to only light the lamp or fully raised so as to both light the lamp and sound the horn as desired. Of course the light and horn circuits may be provided with other switches to render them ineffective whenever desired.

At times when the handle 36 may be used the spring 16 will be strong enough for holding the arm 11 in its horizontal position, for the signal arm may then be lowered by means of the handle, but at times when the knob 37 is used the spring may be removed so that the arm 11 will swing downwardly by its own weight when the knob 37 is released.

What I claim as new and desire to secure by Letters Patent is:

1. A signal for automobiles and the like, comprising a bracket, a stud projecting therefrom, an arm having a casing pivotally mounted on the stud, a cylindrical contact shell carried by the stud and insulated therefrom and provided with a cut-away portion, spring contact brushes carried by and insulated from the casing and adapted to bear on the contact shell, and an electric lamp carried by the arm having connection with the contact brushes.

2. A signal for automobiles and the like, comprising a bracket, a stud projecting therefrom, a cylindrical casing pivotally mounted on the stud, a coil spring surrounding the stud and bearing on the casing to hold the face of the casing against the face of the bracket, a lug on one face engaging the other, a flange on the stud engaged by the spring, a cylindrical contact shell having an internal flange, insulating washers mounted on the stud and engaging the internal flange of the contact shell between them, spring contact brushes carried by but insulated from the casing and bearing on the contact shell, said contact shell having cut-away portions at which the contact brushes lose their engagement therewith, an arm projecting from the casing, an electric lamp carried by the arm and connected with the contact brushes, and means for swinging the arm.

3. A signal for automobiles and the like, comprising a bracket, a stud projecting therefrom, a cylindrical casing pivotally mounted on the stud, a coil spring surrounding the stud and bearing on the casing to hold the face of the casing against the face of the bracket, a lug on one face engaging the other, a flange on the stud engaged by the spring, a cylindrical contact shell having an internal flange, insulating washers mounted on the stud and engaging the internal flange of the contact shell between them, spring contact brushes carried by, but insulated from the casing and bearing on the contact shell, said contact shell having cut-away portions at which the contact brushes lose their engagement therewith, an arm projecting from the casing, an electric lamp carried by the arm and connected with the contact brushes, means for swinging the arm, a cover for the casing slidably mounted on the stud, and a spring mounted on the stud and bearing on the cover.

In testimony whereof, I affix my signature, in presence of two witnesses.

CHARLES R. PIGGINS.

Witnesses:
R. S. C. CALDWELL,
KATHERINE HOLT.